Feb. 6, 1968 L. OSBORN 3,367,596

REEL MOUNTING AND REEL MOUNTING ASSEMBLY

Filed Dec. 16, 1966

Inventor:
Lloyd Osborn,
By Brown, Jackson, Boettcher & Dienner
Attys.

United States Patent Office 3,367,596
Patented Feb. 6, 1968

3,367,596
REEL MOUNTING AND REEL MOUNTING ASSEMBLY

Lloyd Osborn, Stevensville, Mich., assignor to V-M Corporation, Benton Harbor, Mich., a corporation of Michigan Filed Dec. 16, 1966, Ser. No. 602,333
16 Claims. (Cl. 242—68.3)

The present invention relates generally to reel mounting and more particularly to a novel means for releasably securing a tape storage reel to a tape transport mechanism.

It is conventional in the tape recorder and motion picture arts to utilize reels for storing the continuous strip tapes and films. The reels are generally adapted to be mounted on a tape or film transport mechanism on the recorders or projectors in such a fashion as to allow transfer of the tape from a supply reel to a take-up reel, with mechanism being disposed intermediate the supply and take-up reels for effecting recording or playback, or projecting a light source through the film. The prior art devices, in general, provide for securing the reels to the transport mechanisms through separate lock nuts or manually operated clamps which require the operator to manually tighten the locking means when mounting a reel or to release the lock prior to removing the reel from the transport mechanism. The requirements for separate locking means and separate motions by the operator to lock the reels to or release the reels from the apparatus with which they are used contribute to the number of technical failures which lead to inoperativeness of the apparatus and add to the time required to change reels.

It is therefore a primary object of the present invention to overcome the disadvantages present in the prior art devices by providing a tape transport mechanism having a novel means for automatically releasably securing a tape reel thereto to thereby eliminate the need for a separate lock nut or other manually operated reel locking devices.

Another object of the present invention is to provide a novel means for automatically releasably securing a tape storage reel to a tape transport mechanism, which means allows for a one-hand, snap-on action by the operator in mounting the reel and also eliminates the possibility of accidental operation of the device with unlocked reels.

A further object of the present invention is to provide a novel means for releasably securing a tape storage reel to a tape transport mechanism, which means allows the reel to be secured to the mechanism by merely pressing the reel against the transport mechanism, and released by pulling the reel from the transport mechanism.

Another object of the present invention is to provide a novel means for securing a tape storage reel to a tape transport mechanism which utilizes a plurality of vertically disposed locking pins slidably mounted on the transport mechanism and which pins are received through and operatively associated with the reel to thereby secure it to the transport mechanism.

A further object of the present invention is to provide a means for securing a tape storage reel to a tape transport mechanism wherein a plurality of vertically disposed locking pins on the transport mechanism include locking grooves which are resiliently urged into locking engagement with the peripheral edge portions of apertures in the reel to thereby releasably secure the reel to the transport mechanism.

Still another object of the present invention is to provide a reel mounting means as described wherein the locking grooves include beveled side edge surfaces to allow ready release of the reel from the transport mechanism.

Further objects and advantages of my invention, together with the organization and manner of operation thereof may best be understood by reference to the following description, taken in connection with the accompanying drawing wherein like reference numerals identify like elements and in which.

Figures 1, 2, 3:
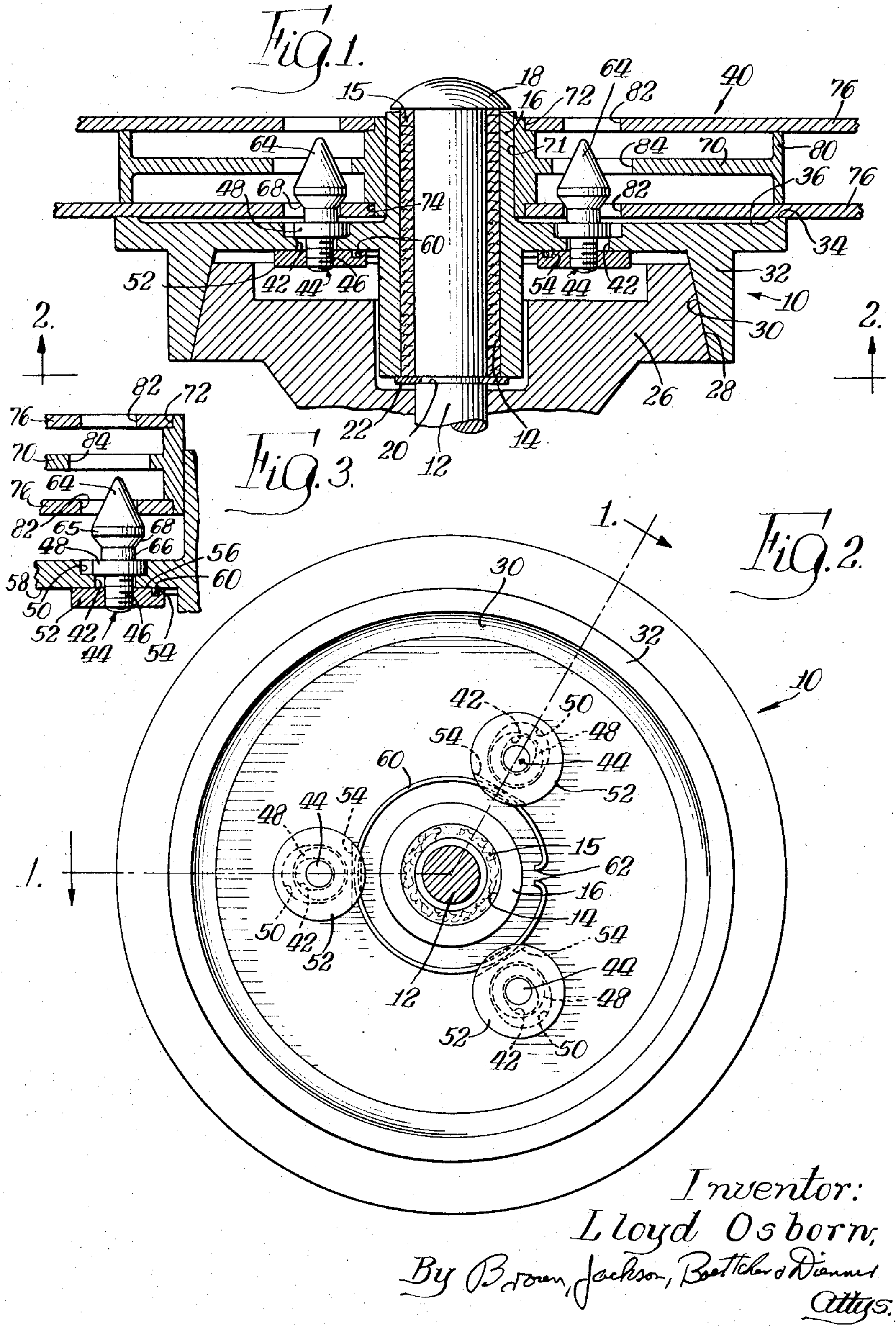
FIGURE 1 is a vertical sectional view taken substantially along the lines 1—1 of FIGURE 2 illustrating a reel mounting hub including means for releasably securing a reel thereto in accordance with the present invention.
FIGURE 2 is a bottom plan view taken substantially along the lines 2—2 of FIGURE 1 with the mounting hub drive plate removed.
FIGURE 3 is a partial sectional view illustrating a reel retaining pin with the reel being shown as it is initially associated with the retaining pin during assembly of the parts.

Referring now to the drawing, a reel mounting hub, shown generally by reference numeral 10, is illustrated as being rotatably mounted upon a supporting shaft 12. The mounting hub 10 has a central aperture 14 therein defined by a generally longitudinally extending annular wall portion 16. The central aperture 14 is adapted to snugly receive an oillite sleeve bearing 15 which in turn receives the shaft 12 and provides a bearing surface to facilitate rotation of the mounting hub 10 on the shaft 12. The shaft 12 includes an upper cap portion 18 which serves as an upper stop against which the mounting hub 10 may be positioned, and further includes an annular groove 20 to receive a snap ring 22 which abuts the bottom end of the annular wall 16 to thereby secure the mounting hub 10 in fixed axial relation on the shaft 12.

A mounting hub drive plate 26 having a generally conical drive surface 28 thereon is rotatably mounted on the shaft 12 and is adapted for axial movement on shaft 12 such that the drive surface 28 will engage a mating conical surface 30 provided on a depending annular flange portion 32 of the reel mounting hub 10. The means for effecting driving rotation of the drive plate 26 and axial movement thereof on shaft 12 to engage the surface 30 of mounting hub 10 may be of a conventional nature and forms no part of the present invention. The plate 26 may also be used to brake or otherwise control the rotational speed of hub 10 if it is desired that the reel mounting hub be freely rotatable as, for example, when used in conjunction with a tape supply reel.

The mounting hub 10 includes generally annular reel supporting surface 34 having a slightly depressed annular portion 36 therein. The surface 34 serves to support a reel, indicated generally at reference numeral 40, when the reel is mounted upon the reel mounting hub 10 as will be more fully described hereinbelow. The annular wall 16 of mounting hub 10 has an outer peripheral surface 38 adapted to receive and center the reel 40 thereon such that the reel may engage the surface 34 of the mounting hub. The depressed surface portion 36 of the mounting hub is provided with a plurality of elongated apertures 42 therethrough. Preferably, three equally circumferentially spaced apertures are provided which have their major axes disposed in generally radial relation to the axis of rotation of the reel mounting hub 10. Each of the elongated apertures 42 receives a reel retaining pin 44 therethrough such that the pins 44 may be moved radially within the elongated slots 42.

Each of the reel retaining pins 44 includes a shank portion 46 having an outer diameter sufficient to provide a sliding fit within its corresponding elongated aperture 42. The pins 44 also include annular flange portions 48 which are received within corresponding elongated slots or recesses 50 provided in the mounting hub surface 36 adjacent the elongated apertures 42. The elongated slots 50 are larger than their corresponding elongated apertures 42 so as to provide support shoulder surfaces 51 therebetween which engage the under surfaces of the annular flanges 48 to thereby support the retaining pins 44 in vertical position relative to the mounting hub surface 36. The reel retaining pins 44 are held in said vertical positions within the mounting hub 10 by retainer means such as nut members 52 or similar means which are suitably secured to the shank portions 46 of the reel retaining pins as by threadedly engaging the shanks 46 or being swaged thereon. The nut members 52 include upper surfaces 56 which abut the surface 58 of mounting hub 10 in a manner to allow relative sliding of the pins 44 within their respective elongated apertures 42.

Each of the pin retainers 52 is provided with a groove or slot 54 in the surface 56 thereof which abuts the surface 58 of mounting hub 10. Each slot or groove 54 of a retainer 52 is disposed in generally crosswise relation to a radius of the shank 46 which passes through the center of the retainer and each slot serves as a means to receive a generally circular spring 60 therethrough. The spring 60 has a diameter such that when it is inserted in the slots 54 of the retainers 52 it will urge the retaining means and their respective reel retaining pins 44 radially inward within their respective elongated apertures 42. The spring 60 has terminal end portions 62 which allow it to expand and thereby allow radially outward movement of the reel retaining pins 44 within their elongated slots.

The upper portions of the reel retaining pins 44 have generally conical surfaces 64. A cylindrical surface portion 65 is provided at the base of each conical surface 64 with an annular locking recess 66 being formed intermediate the surface 65 and the annular flange 48. The locking recesses 66 have conical side wall portions 68 which serve as cam surfaces during assembly and disassembly of the reel 40, onto the mounting hub 10 as is described below.

The tape mounting reel 40 is preferably comprised of an annular center hub 70 having a central aperture 71 to receive and engage the peripheral surface 38 of mounting hub 10. The center hub 70 is provided with annular shoulder portions 72 and 74 thereon to receive and support identical annular side plate members, or reel flanges, 76, the side plate members being fixedly secured to the shoulders 72 and 74 in any suitable manner. The center hub 70 also includes an annular wall portion 80, the outer end portions of which abut the inner surfaces of the side plate members 76 and the outer peripheral surface of which provides a mounting support surface for a flexible tape (not shown) in a conventional manner. The side plate members 76 have a plurality of apertures 82 formed therein corresponding to the number of reel retaining pins 44 provided on the mounting hub 10. Each of the apertures 82 has a diameter slightly larger than that of the annular surface portions 65 of the reel retaining pins 44 so as to readily receive a retaining pin therethrough during assembly of the tape reel 40 onto the reel mounting hub 10. The radial distance of the centers of apertures 82 from the center axis of reel 40 is greater than the radial distance of the axes of pins 44 from the axis of rotation of mounting hub 10 when the pins are in their radial inward positions within the elongated apertures 42. As the diameters of the apertures 82 are slightly greater than the diameters of the annular surface portions 65 on the retaining pins 44, it will be seen that the peripheral edge portions of the apertures 82 closest to the axis of rotation of the reel 40 will engage the conical surface portions 64 of the retaining pins and urge the pins radially outward as the reel is mounted upon the reel mounting hub 10, as shown in FIGURE 3. The center hub 70 of reel 40 is provided with a plurality of apertures 84 which have diameters substantially larger than the diameters of the annular surface portions 65 of retaining pins 44 and are positioned so as to allow retaining pins 44 to be readily received within the reel 40 during assembly of the reel onto the mounting hub 10. While the reel 40 has been described as comprising the center hub 70 having side plate members 76 affixed thereto, it will be understood that reel 40 may be formed as an integral unit as by casting, etc.

Having thus described the elements comprising a preferred embodiment of the reel mounting hub and tape supporting reel in accordance with the present invention, mounting of the reel onto the hub will now be described. As the tape reel 40 is mounted on the peripheral surface 38 of the reel supporting hub 10, the apertures 82 in the side plate member 76 which is to engage the supporting surface 34 will receive the conical surface portions 64 of the reel retaining pins 44. The peripheral edge portions of the apertures 82 closest to the axis of rotation of the tape reel 40 will engage the conical surface portions 64 of the retaining pins 44 and urge the retaining pins outwardly within their elongated apertures 42. As the mounting reel 40 is moved further downwardly, the edge portions of the apertures 82 which engage the reel retaining pins 44 will pass over the annular surface portions 65 and into the locking recesses 66 such that the upper edge portions of the apertures 82 engage the conical surfaces 68 defining the locking recesses 66. It will be understood that the axial length of each locking recess 66 and its corresponding conical wall surface 68 must be greater than the thickness of the end plate members 76 of the tape reel 40 to ensure that the locking recesses will receive and engage the peripheral edge portions of the apertures 82. When the reel 40 is fully mounted such that the outer surface of side plate member 76 engages surface 34 of the mounting hub 10, the reel retaining pins 44 will be urged radially inwardly by spring 60 to thereby releasably secure the reel 40 onto the mounting hub 10.

When it is desired to remove the tape reel 40 from the mounting hub 10, the reel is pulled axially away (that is, it is lifted vertically in the FIG. 1 illustration) from the hub support surface 34. This may be easily done by one hand. The peripheral edge portions of the apertures 82 engaging the retaining pins 44 will ride up the conical surfaces 68 of the retaining pins to thereby move the retaining pins outwardly within their respective elongated apertures 42 and allow the tape reel to be withdrawn from the locking recesses 66 of the reel retaining pins. This will allow the tape reel 40 to be completely removed from the mounting hub 10 without any manual unlatching or unlocking action. By providing apertures 82 in both side plate members 76 of the tape reel 40, either side plate may be mounted on the mounting hub adjacent the supporting surface 34 and the above-described releasable locking effect of the reel retaining pins 44 will be accomplished.

While a preferred embodiment of my invention has been shown and described, it will be obvious to those skilled in the art that changes and modifications may be made therein without departing from the invention in its broader aspects, and therefore, the appended claims are intended to cover all such changes and modifications as fall within the true spirit and scope of my invention.

I claim:

1. In a reel mounting assembly, the combination comprising a rotatable reel mounting hub including a reel engaging surface thereon, said reel engaging surface having a plurality of elongated apertures therein, a plurality of reel retaining pins extending outwardly from said surface and being slidably mounted within said apertures for movement therein, each of said pins having a locking recess therein disposed outwardly from said reel engaging surface, and a reel releasably supported against said reel engaging surface, said reel having a plurality of apertures therein adapted to receive the upper portions of said pins, said reel apertures being positioned within said reel such that peripheral edge portions of said apertures releasably engage corresponding locking recesses in said pins when said reel is disposed on said pins adjacent said reel engaging surface.

2. The combination as defined in claim 1 wherein said elongated apertures have their major axes disposed in generally radial relation to the axis of rotation of said hub.

3. The combination as defined in claim 1 including means operatively associated with said pins to urge them radially, relative to the axis of rotation of said hub, within said apertures.

4. The combination as defined in claim 1 wherein said elongated apertures have their major axes disposed in generally radial relation to the axis of rotation of said hub, and including means operatively associated with said pins to urge them radially inwardly within said elongated apertures.

5. The combination as defined in claim 1 including means for urging said retaining pins radially, relative to the axis of rotation of said hub, within said elongated apertures, and wherein said reel apertures are disposed slightly radially relative to the upper portions of said pins when urged radially within said elongated apertures such that when said reel is mounted upon said reel supporting surface, said retaining pins will initially be moved radially through engagement of the upper portions thereof with the peripheral edge portions of said reel apertures, said pins being returned to their original radial positions where said locking recesses receive and engage the peripheral edge portions of said reel apertures in locking relation when said reel engages said reel supporting surface to thereby releasably retain said reel on said reel mounting hub.

6. The combination as defined in claim 3 wherein said means operatively associated with said pins to urge them radially within said elongated apertures includes a single spring.

7. The combination as defined in claim 1 wherein the upper end portion of each of said reel retaining pins is provided with a generally conical surface to facilitate the introduction thereof through a corresponding reel aperture.

8. The combination as defined in claim 7 wherein said pin locking recesses comprise annular grooves disposed below said upper conical surfaces of said pins and above said reel engaging surface of said reel mounting hub.

9. The combination as defined in claim 8 wherein said annular grooves are defined by at least one generally conical annular side wall portion to facilitate removal of said reel from said pins and said reel mounting hub.

10. The combination as defined in claim 1 wherein said reel retaining pins include lower shank portions, and including pin retainer means adapted to securely engage said shank portions to thereby maintain said pins in vertical position relative to said reel engaging surface.

11. The combination as defined in claim 10 wherein said pin retainer means include slots therein, and further including spring means operatively associated with said slots to urge said retainer means and said retaining pins radially within their corresponding elongated apertures.

12. In a reel mounting assembly, the combination comprising rotatable reel mounting means having a surface adapted to engage a flange of a reel and having rigid reel retaining pin means projecting outwardly from said surface and laterally movable with respect to said surface, a reel having at least one flange with said flange having at least one aperture defined by wall means, said pin means having a flange engaging recess adapted to cooperate with said wall means of said flange for securing the flange against said surface, resilient means urging said pin means toward a first position where the reel is drivingly securable on said rotatable reel mounting means by said recess with the reel flange against said surface, and cam surfaces operable between said wall means of the flange and said pin means whereby association or disassociation of the reel relative to said rotatable reel mounting means will cause displacement of said pin means from said first position against the action of said resilient means.

13. Rotatable reel mounting means having a surface adapted to engage a flange of a reel, and having rigid reel retaining pin means projecting outwardly from said surface and laterally movable with respect to said surface, said pin means having a flange engaging recess adapted to cooperate with wall means which defines an aperture in a reel flange for securing the reel flange against said surface, resilient means urging said pin means toward a first position where the reel is adapted to be drivingly secured on said rotatable reel mounting means by said recess with the reel flange against said surface, cam surfaces on said pin means operable between said wall means of the flange and said pin means whereby association or disassociation of a reel relative to said rotatable reel mounting means will cause displacement of said pin means from said first position against the action of said resilient means.

14. For use with a tape reel and the like having a plurality of mounting apertures therein, a mounting hub assembly comprising, in combination, a rotatable mounting hub having a reel supporting surface thereon, said mounting hub including a plurality of elongated apertures therein, a plurality of reel retaining pins slidably supported within said elongated apertures, each of said retaining pins including a locking recess therein disposed above the plane of said reel supporting surface, said elongated apertures being positioned within said reel supporting surface such that said reel retaining pins will be received within the mounting apertures in the reel when the reel is mounted on said reel supporting surface, and means for urging said retaining pins to positions within said elongated apertures wherein the peripheral edge portions of the reel mounting apertures will be received within respective locking recesses to thereby releasably retain the reel on said reel mounting hub.

15. The mounting hub assembly as defined in claim 14 wherein said reel retaining pins are provided with a generally conical peripheral surface on the upper portions thereof to facilitate the introduction of said reel retaining pins through the reel mounting apertures.

16. The mounting hub assembly as defined in claim 14 wherein said elongated apertures have their major axes disposed in generally radial relation to the axis of rotation of said reel mounting hub, and wherein said means for urging said retaining pins within said elongated apertures includes a single spring operatively associated with said pins to urge them radially inwardly within said elongated apertures.

References Cited

UNITED STATES PATENTS 2,983,531 5/1961 Moro ---------- 242—68.3 XR

FRANK J. COHEN, *Primary Examiner.*

N. L. MINTZ, *Assistant Examiner.*